United States Patent [19]
Shimamori et al.

[11] Patent Number: 5,853,872
[45] Date of Patent: Dec. 29, 1998

[54] MAGNETO-OPTICAL RECORDING MEDIUM

[75] Inventors: Takumi Shimamori, Machida; Yoko Ikeda, Yokohama; Yoshinori Seki, Kawasaki; Takeshi Kuriwada, Machida, all of Japan

[73] Assignee: Mitsubishi Chemical Corporation, Japan

[21] Appl. No.: 768,867

[22] Filed: Dec. 17, 1996

Related U.S. Application Data

[60] Continuation of Ser. No. 479,604, Jun. 7, 1995, abandoned, which is a division of Ser. No. 151,372, Nov. 12, 1993, abandoned.

[30] Foreign Application Priority Data

| Nov. 17, 1992 | [JP] | Japan | 4-307089 |
|---|---|---|---|
| Feb. 19, 1993 | [JP] | Japan | 5-030766 |
| Feb. 19, 1993 | [JP] | Japan | 5-030767 |
| Feb. 19, 1993 | [JP] | Japan | 5-030768 |
| Feb. 19, 1993 | [JP] | Japan | 5-030769 |
| Jun. 21, 1993 | [JP] | Japan | 5-149265 |
| Jun. 21, 1993 | [JP] | Japan | 5-149266 |
| Jun. 21, 1993 | [JP] | Japan | 5-149267 |

[51] Int. Cl.$^6$ .............................. G11B 5/64; G11B 5/66; G11B 5/70; G11B 11/00
[52] U.S. Cl. .................. 428/332; 428/694 RL; 428/694 RE; 369/13
[58] Field of Search .............. 428/694 SC, 694 RE, 428/694 RL, 694 AH, 65.5, 64.6, 332; 369/13, 288

[56] References Cited

U.S. PATENT DOCUMENTS

| 4,596,740 | 6/1986 | Tsukane | 428/694 |
|---|---|---|---|
| 4,786,559 | 11/1988 | Murakami et al. | 428/694 |
| 4,792,474 | 12/1988 | Murakami et al. | 428/64 |
| 4,838,962 | 6/1989 | Takeyama et al. | 148/304 |
| 4,923,765 | 5/1990 | Takayama et al. | 428/694 |
| 4,937,098 | 6/1990 | Nishibana et al. | 427/132 |
| 4,956,243 | 9/1990 | Miyake et al. | 428/694 |
| 5,040,166 | 8/1991 | Kobayashi et al. | 369/275.2 |
| 5,055,353 | 10/1991 | Yamamoto et al. | 428/694 |
| 5,076,967 | 12/1991 | Taja et al. | 252/511 |
| 5,093,174 | 3/1992 | Suzuki et al. | 428/64 |
| 5,095,350 | 3/1992 | Ohta et al. | 357/27 |
| 5,143,797 | 9/1992 | Hashima et al. | 428/694 |
| 5,173,341 | 12/1992 | Shiratari et al. | 427/434.6 |
| 5,270,987 | 12/1993 | Kahn et al. | 369/13 |
| 5,288,998 | 2/1994 | Belzig et al. | 250/227.26 |
| 5,527,605 | 6/1996 | Doessel et al. | 428/332 |
| 5,620,767 | 4/1997 | Harigaya et al. | 428/64.4 |

FOREIGN PATENT DOCUMENTS

| 88582 | 4/1985 | European Pat. Off. . |
|---|---|---|
| 59-8150 | 1/1984 | Japan . |
| 59-38781 | 3/1984 | Japan . |
| 59-132434 | 7/1984 | Japan . |
| 1171142 | 7/1989 | Japan . |
| 76841 | 3/1992 | Japan . |

*Primary Examiner*—John J. Zimmerman
*Assistant Examiner*—Michael LaVilla
*Attorney, Agent, or Firm*—Nixon & Vanderhye

[57] ABSTRACT

A magneto-optical recording medium having, in the following order, a substrate, a magneto-optical recording layer having a Curie temperature of not less than 220° C., and a reflective layer mainly composed of Ag and having a refractive index of not more than 0.5 at a wavelength of less than 600 nm is written with an external magnetic field and a laser beam with a wavelength of less than 600 nm while read-out is with the laser beam also at a wavelength less than 600 nm.

9 Claims, No Drawings

MAGNETO-OPTICAL RECORDING MEDIUM

This is a Rule 62 File Wrapper Continuation of application Ser. No. 08/479,604, filed Jun. 7, 1995, which is a division of Ser. No. 08/151,372 filed Nov. 12, 1993 both now abandoned.

BACKGROUND OF THE INVENTION

The present invention relates to a magneto-optical recording medium capable of optical recording and reading-out of information using thermo-magnetic recording techniques and magneto-optical effects, and an optical information recording and reading out method using such a magneto-optical recording medium.

With the remarkable increase of the amount of information in recent years, request has risen for the improvement of recording density for information recording media. Optical disc is high in recording density and also excellent in random access and portability. Especially, the magneto-optical disc is capable of repeated recording and also excellent in reliability, so that it has already been commercialized as a recording medium for external memory devices for computers and various recording devices.

The memory capacity of the presently marketed magneto-optical discs is in the order of 300 megabytes (MByte) per one side of a 5.25 inch disc. For increasing this memory capacity to the level of one gigabyte (GByte) per one side of a 5.25 inch disc, many proposals have been made, such as shortening the track pitch or changing the recording signal modulation system, with some of such ideas being ready put to practical use.

However, in view of the fact that the current recording density is already close to the theoretical limit, it is deemed hardly possible to further enhance the recording density with the presently available techniques. The decisive factor in the theoretical limit of recording density of optical discs is the size of the concentrated spot of laser light used for optical recording and reading out. Therefore, in order to further elevate the recording density, it is essential to concentrate the laser light into smaller spot.

The spot diameter (d) of laser light is determined by wavelength (λ) of laser light and numerical aperture (NA) of objective lens and thus is defined by the following formula (I):

$$d = k \cdot \lambda / NA \quad (I)$$

wherein k is a constant which is decided by the shape of lens aperture and strength distribution of incident beam.

For modifying the laser light spot diameter (d), it is necessary to use a light source with a short wavelength and an objective lens with a large numerical aperture (NA). When the numerical aperture of the lens is enlarged, the focus depth is reduced and also tolerance for tilt of the disc or thickness unevenness of the substrate drops sharply, resulting in a decrease of servo capacity of the optical head.

It is, therefore, hardly possible to notably enlarge the numerical aperture of the lens from the current level of about 0.55. Hence, in order to enhance recording density by reducing the laser light spot diameter, it is essential to use a light source (for the optical head) with a shorter wavelength than 830 nm or 780 nm which is currently put to practical use.

The quality of readout signal of magneto-optical disc is influenced by the reflectivity and the magnetic Kerr rotation angle. More specifically, this is represented by the product of the square root of the reflectivity and the magnetic Kerr rotation angle. It is here called "figure of merit".

For the recording layer of the presently marketed magneto-optical discs, there are used heavy rare earth-transition metal amorphous alloys, a typical example thereof being TbFeCo. These alloys show a relatively large figure of merit when the wavelength of laser beam in a current magneto-optical disc drive is around 800 nm, but the figure of merit decreases sharply when the laser beam wavelength is shortened to less than 600 nm.

It is to be also noted that detection sensitivity of photo-diode of a photo-detector used for disc drive signal detection is high at around 800 nm but decreases sharply at less than 600 nm. These facts indicate that with the current techniques, the readout signal strength declines excessively in the short wavelength region, making it impossible to perform stable reading-out of recorded signals.

As explained above, the decrease of the reading-out signal strength in the short wavelength region a serious problem for realizing a magneto-optical recording and reading out system using a short-wavelength light source for enhancing recording density.

Therefore, it is imperative for obtaining large readout signals to enlarge the figure of merit of the recording medium and to improve sensitivity of the photo-detector.

Light detection in the photodiodes used for magneto-optical disc drive is accomplished as the light excites the electrons near the pn junction into the conduction band and the electrons in the conduction band move through the pn junction, causing flow of an electric current through the photodiodes.

The light absorption coefficient of the Si semiconductor constituting the photodiode increases in the short wavelength, so that the light with a short wavelength tends to be absorbed near the surface of the photodiode and has difficulty in reaching the pn junction.

Consequently, the number of the electrons excited near the pn junction decreases, resulting in a reduced light detecting sensitivity. Thus, it is theoretically difficult to enhance detecting sensitivity of the photo-detector in the short wavelength region, and therefore it is important to enlarge figure of merit of the recording medium for obtaining large readout signals in the short wavelength region.

When recording was actually carried out on a common recording medium by reducing the bit interval with 488 nm Ar laser, it was found that the carrier to noise ratio (hereinafter abbreviated as C/N ratio), which indicates the readout signal quality, decreases.

Drop of C/N ratio signifies an increase of error rate in reading-out the signal. Therefore, for elevating recording density by reducing the recording bit interval, it is necessary to make the C/N ratio greater than that of the current recording medium.

The C/N ratio of a magneto-optical disc is affected by the reflectivity and magnetic Kerr rotation angle. More specifically, C/N ratio is represented by the product, so-called "figure of merit", of the square root of reflectivity and the magnetic Kerr rotation angle. Thus, in order to elevate recording density by reducing the recording bit interval, it is essential to increase reflectivity or magnetic Kerr rotation angle of the magneto-optical recording medium.

A magneto-optical disc is generally constituted by multi-layers such as a magneto-optical recording layer, a light interference layer, a light reflective layer and a protective layer disposed on a transparent substrate. All of these layers must be considered in determining the figure of merit which governs C/N ratio.

Our invention is a magneto-optical recording medium comprising at least a magneto-optical recording layer and a reflective layer disposed on a substrate, by using, as the magneto-optical recording layer, a recording layer having a Curie temperature of not less than 220° C. and as the reflective layer, a layer composed of Ag or an Ag alloy, the thus-obtained magneto-optical recording medium shows excellent reading-out characteristics in the wavelength region of less than 600 nm and anti-corrosivity, and it is capable of high-density optical information recording and reading-out. The present invention was achieved on the basis of this finding.

SUMMARY OF THE INVENTION

An object of the present invention is to provide a magneto-optical recording medium by choosing optimum materials constituting the respective layers, optimum layer thickness and optimum layer structure, showing an elevated figure of merit in the wavelength region less than 600 nm, and an optical information recording and reading out system using a light source with a short wavelength less than 600 nm.

It is another object of the present invention to provide a magneto-optical recording medium which shows an excellent figure of merit and a high reliability at the same time.

To achieve these objectives, in the first aspect of the present invention, there is provided an optical recording or reading out method comprising recording or reading out an information on or from a magneto-optical recording medium comprising a substrate, and at least a magneto-optical recording layer having a Curie temperature of not less than 220° C. and a reflective layer mainly composed of Ag and having a refractive index of not more than 0.5 at a wavelength of less than 600 nm, the magneto-optical recording layer and reflective layer being formed on the substrate, while using laser beam with a wavelength of less than 600 nm.

In the second aspect of the present invention, there is provided a magneto-optical recording medium comprising a substrate, and at least a magneto-optical recording layer having a Curie temperature of not less than 220° C. and a reflective layer mainly composed of Ag and having a refractive index of not more than 0.5 in the wavelength region less than 600 nm, the magneto-optical recording layer and reflective layer being formed on the substrate.

In the third aspect of the present invention, there is provided a magneto-optical recording medium comprising a substrate, and at least a magneto-optical recording layer having a Curie temperature of not less than 220° C. and a reflective layer mainly composed of Ag and having a refractive index of not more than 0.5 in the wavelength region less than 600 nm, the magneto-optical recording layer and reflective layer being formed on the substrate, and the reflective layer comprising an Ag alloy composed of not less than 70 atom % of Ag and not more than 30 atom % of at least one element selected from the group consisting of Ti, Rh, Pd, Pt, Au, V, Cr, Mn, Fe, Co, Ni, Zr, Nb, Mo, Ta and W.

In the fourth aspect of the present invention, there is provided a magneto-optical recording medium comprising a substrate, and at least a dielectric layer, a magneto-optical recording layer having a Curie temperature of not less than 220° C., a reflective layer mainly composed of Ag and a protective layer composed of an acrylic ultraviolet curing resin, the dielectric layer, the magneto-optical recording layer, the reflective layer and the protective layer being formed on the substrate in order.

In the fifth aspect of the present invention, there is provided a magneto-optical recording medium comprising a substrate, and at least a magneto-optical recording layer having a Curie temperature of not less than 220° C., a reflective layer mainly composed of Ag and having a refractive index of not more than 0.5 in the wavelength region less than 600 nm and a protective layer, the magneto-optical recording layer, reflective layer and protective layer being formed on the substrate in order, and the surface of the reflective layer contacting the protective layer being surface-treated with a triazinethiol-based compound represented by the following formula (I):

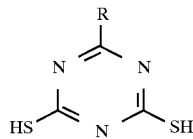

[1]

wherein R represents —$SR^1$ or —$NR^2R^3$ in which $R^1$, $R^2$ and $R^3$ each represents a hydrogen atom or a hydrocarbon group which is preferably a $C_{1-20}$ alkyl, $C_{2-20}$ alkenyl, or $C_{6-20}$ aryl group.

In the sixth aspect of the present invention, there is provided a magneto-optical recording medium comprising a substrate, and at least a magneto-optical recording layer having a Curie temperature of not less than 220° C., a reflective layer mainly composed of Ag and having a refractive index of not more than 0.5 in the wavelength region less than 600 nm and a protective layer composed of an acrylic ultraviolet curing resin containing 0.001 to 0.05 wt % of a triazinethiol-based compound represented by the following formula (I), the magneto-optical recording layer, reflective layer and protective layer being formed on the substrate in order:

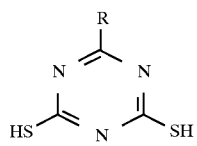

[1]

wherein R represents —$SR^1$ or —$NR^2R^3$ in which $R^1$, $R^2$ and $R^3$ each represents a hydrogen atom or a hydrocarbon group which is preferably a $C_{1-20}$ alkyl, $C_{2-20}$ alkenyl, or $C_{6-20}$ aryl group.

In the seventh aspect of the present invention, there is provided a magneto-optical recording medium comprising a substrate, and at least a dielectric layer, a magneto-optical recording layer having a Curie temperature of not less than 220° C., a reflective layer mainly composed of Ag and a protective layer composed of an acrylic ultraviolet curing resin, the dielectric layer, the magneto-optical recording layer, the reflective layer and the protective layer being formed on the substrate in order, and the surface of the reflective layer contacting the protective layer being surface-treated with a triazinethiol-based compound represented by the following formula (I):

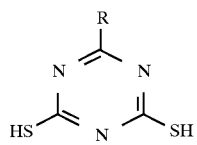

[1]

wherein R represents —$SR^1$ or —$NR^2R^3$ in which $R^1$, $R^2$ and $R^3$ each represents a hydrogen atom or a hydrocarbon group which is preferably a $C_{1-20}$ alkyl, $C_{2-20}$ alkenyl, or $C_{6-20}$ aryl group.

In the eighth aspect of the present invention, there is provided a magneto-optical recording medium comprising a substrate, and at least a dielectric layer, a magneto-optical recording layer having a Curie temperature of not less than 220° C., a reflective layer mainly composed of Ag and a protective layer composed of an acrylic ultraviolet curing resin containing 0.001 to 0.05 wt % of a triazinethiol-based compound represented by the following formula (I), the dielectric layer, the magneto-optical recording layer, the reflective layer and the protective layer being formed on the substrate in order:

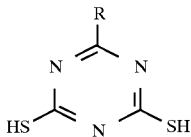

[1]

wherein R represents $-SR^1$ or $-NR^2R^3$ in which $R^1$, $R^2$ and $R^3$ each represents a hydrogen atom or a hydrocarbon group which is preferably a $C_{1-20}$ alkyl, $C_{2-20}$ alkenyl, or $C_{6-20}$ aryl group.

DETAILED DESCRIPTION OF THE INVENTION

As the substrate of the magneto-optical recording medium according to the present invention, there can be used, for example, glass, plastics such as polycarbonates and a substrate composed of a plane glass and a grooved resin film for optical head guide, which is formed thereon. The depth and interval of the grooves are optimized in conformity to the wavelength used, that is, it is preferable that the grooves be made smaller in depth and narrower in interval as the wavelength is shortened.

Birefringence of the substrate is preferably minimized within limits not prejudicial to the magneto-optical recording quality. The substrate thickness is usually about 1 to 2 mm.

The dielectric layer is a layer for making light interference. It is usually disposed between the substrate and a magneto-optical recording layer to effect multiple reflection of light therebetween. Thus, this layer has the role of increasing the apparent magnetic Kerr rotation angle and reducing reflectivity Satisfactory interfering effects can not be obtained unless its thickness is changed in accordance with the wavelength of laser beam used.

When, for instance, the wavelength is around 600 nm, the dielectric layer thickness is preferably about 40 to 55 nm (in case of utilizing the primary interference thickness) and about 180 to 195 nm (in case of utilizing the secondary interference thickness). When the wavelength is around 400 nm, the dielectric layer thickness is preferably about 25 to 35 nm (in case of utilizing the primary interference thickness) and about 120 to 130 nm (in case of utilizing the secondary interference thickness).

The dielectric layer also has the roles of elevating adhesiveness between the substrate and the magneto-optical recording layer, heat-insulating the magneto-optical recording layer from the substrate and protecting the magneto-optical recording layer from moisture which may enter through the substrate.

A dielectric layer may be also disposed between the magneto-optical recording layer and a reflective layer. This enables further enhancement of the light interference effect and an increase of the magnetic Kerr rotation angle. Satisfactory interfering effect can not be obtained unless the thickness of each of the two dielectric layers is changed respectively in conformity to the wavelength of laser beam used.

The dielectric layer disposed between the magneto-optical recording layer and the reflective layer, in addition to its role of interfering light, also serve for heat-insulating the magneto-optical recording layer from the reflective layer. As for the material of such dielectric layer, usually an amorphous thin film made of silicon nitride, tantalum oxide, silicon oxide, aluminum oxide, titanium oxide, zinc sulfide or a mixture thereof may be exemplified.

The magneto-optical recording layer in the recording medium of present invention is a layer where thermomagnetic recording is performed by applying external magnetic field and heating the layer to the Curie point by concentrated the laser beam, especially one with a wavelength less than 600 nm. For performing desired recording, the magnetization axis needs to be directed perpendicular to the film surface, so that it is preferable that the magneto-optical recording layer has high perpendicular magnetic anisotropy.

Readout is performed by the Kerr effect using a laser beam (weaker than the laser beam used for recording) with a wavelength less than 600 nm. In this case, the light energy density per unit area increases as the concentrated spot diameter is reduced with shortening of wavelength of reading-out light, so that the temperature of the magneto-optical recording layer under the incidence of readout light tends to become higher than the temperature of when the wavelength is around 800 nm.

As the temperature of the magneto-optical recording layer rises, the magnetic Kerr rotation angle decreases, with consequent decrease of the output of readout signal. The lower the Curie temperature of the magneto-optical recording layer is, the higher the decreasing ratio of signal output becomes. It is, therefore, necessary to properly adjust the properties of the magneto-optical recording layer.

The Curie temperature of the conventional magneto-optical recording layer for wavelength of around 800 nm is about 170° C. But when recording and reading-out were conducted with this medium using a laser beam source with a wavelength of 488 nm, recording sensitivity increased extremely while C/N ratio decreased.

It has been found that the Curie temperature rises as the Co content in the Tb—Fe—Co recording layer composition increases. When the Curie temperature is adjusted to be not less than 220° C., the recording sensitivity decrease while C/N ratio rises up. Therefore, it is essential that the Curie temperature of the material of the magneto-optical recording layer for performing recording and reading-out by using laser beam with a wavelength of less than 600 nm is not less than 220° C.

Also, for obtaining a large readout signal, it is preferable that the Kerr rotation angle at the wavelength of laser beam used is large, and it is especially preferable that the Curie temperature is in the range of 220° to 300° C.

As the material of the magneto-optical recording layer which satisfies the above conditions, a Tb—Fe—Co amorphous alloy in which the Co concentration in the 3-d transition metal is 10 to 60 atom %, preferably 15 to 50 atom %, and the Tb concentration is 15 to 30 atom %, and a Nd—Tb—Fe—Co amorphous alloy in which the Co concentration in the 3-d transition metal is 20 to 60 atom %, preferably 35 to 50 atom % may be exemplified.

The thickness of the magneto-optical recording layer should be decided in conformity to the wavelength of the applied light and the optical constant of the reflective layer by taking into consideration recording sensitivity against power of laser beam, figure of merit, etc. This layer thickness is usually 10 to 40 nm, but in view of the beam wavelength less than 600 nm and the combination with the reflective layer mainly composed of Ag, the magneto-optical layer thickness is preferably not more than 30 nm, more preferably 10 to 30 nm.

The reflective layer functions to reflect the light which has passed the magneto-optical recording layer and to return the reflected light back to the magneto-optical recording layer. This enhances the utilization efficiency of light while increasing magnetic Kerr rotation angle to elevate the figure of merit.

The reflective layer also exerts an influence on thermal conductivity of the magneto-optical recording medium. Aluminum or an aluminum alloy is used for the reflective layer of the currently marketed magneto-optical discs designed to be used at a beam wavelength of around 800 nm. On the contrary, in the present invention, a reflective layer mainly composed of Ag is used.

When aluminu, an aluminum alloy or gold is used for the reflective layer as in the prior art, it is impossible to obtain a sufficiently good figure of merit at a wavelength less than 600 nm. Use of a reflective layer mainly composed of Ag has made it possible for the first time to obtain a sufficiently good figure of merit. Especially when a reflective layer mainly composed of Ag is used in combination with the previously described magneto-optical recording layer having a Curie temperature of not less than 220° C., it is possible to obtain an even better figure of merit.

As the metals with high reflectivity, use of such metal as Au, Ag, Cu or Al for the reflective layer of a magneto-optical recording medium (JP-A-58-83364, JP-A-59-132434, JP-A-59-8150, JP-A-59-38781, etc.) has been proposed. The reflectivity of the reflective layer described above is the reflectivity as measured when light was incident upon the reflective layer directly from the outer air.

It is, however, evident from the following fact that such reflectivity is not a matter of substantial significance for figure of merit. That is, reflection of light in the reflective layer of the magneto-optical recording medium takes place at the interface between the magneto-optical recording layer and the reflective layer, or at the interface between the reflective layer and the thermo-insulating layer (interference layer) disposed between the magneto-optical recording layer and the reflective layer, due to the difference in optical constant between the layers, and such reflection is of totally different nature from reflection at the interface between the outer air and the reflective layer.

As a result of examinations in detail of the role played by the Ag alloy reflective layer, it has been found that the effect brought about by the Ag alloy reflective layer is to increase the Kerr rotation angle of the magneto-optical recording layer rather than providing a high reflectivity.

For instance, when reflectivity, Kerr rotation angle and figure of merit are compared between the case where the conventional Al alloy reflective layer is used and the case where the Ag alloy reflective layer of the present invention is used, there are obtained the results such as shown in Table 1. These results indicate that the merit of use of the Ag alloy reflective layer resides not so much in improvement of reflectivity as in increase of the Kerr rotation angle. The measuring wavelength in the above operation was 500 nm.

TABLE 1

| Reflective layer | Al alloy | Ag alloy |
| --- | --- | --- |
| Reflectivity | 17% | 11% |
| Kerr rotation angle | 0.94° | 1.30° |
| Figure of merit | 3.9 | 4.3 |

In case of using the Ag alloy reflective layer, the Kerr rotation angle is increased greatly, and as a consequence, an excellent figure of merit can be obtained. It has been found from a simulation using the optical constant that the above result is attributable to the fact that the refractive index (n) of Ag takes a small value less than 0.5 at a wavelength less than 600 nm.

It has been further found from measurement of optical constant that in the case of Au and Cu which are also high reflectivity metals, the refractive index (n) is small at a wavelength around 800 nm like in the case of Ag, but in the wavelength region less than 600 nm, the refractive index (n) becomes noticeably greater than in the case of Ag and exceeds 0.5.

Further, measurement of optical constant of various kinds of metals and semiconductors showed that Ag is the only element which shows a small value (not more than 0.5) of refractive index in the wavelength region less than 600 nm.

Thus, when the wavelength is around 800 nm, it is possible to obtain good characteristics even when using a reflective layer made of other metals than Ag, such as Au, Cu or Al, but when the wavelength is less than 600 nm, no good characteristics can be obtained unless a reflective layer mainly made of Ag is used.

The reflective layer mainly composed of Ag shows excellent characteristics at a wavelength less than 600 nm only when it is used in combination with a magneto-optical recording layer having a Curie temperature of not less than 220° C. In a magneto-optical medium designed to be used at a wavelength around 800 nm, there is used a magneto-optical recording layer having a Curie temperature of not more than 200° C., usually around 170° C., for bettering recording sensitivity. Even if such a magneto-optical recording layer is used in combination with a reflective layer mainly composed of Ag, it is impossible to obtain an excellent figure of merit at a wavelength less than 600 nm because of small magneto-optical effect of the magneto-optical recording layer.

The reflective layer composed of Ag alone tends to invite a decrease of recording sensitivity because of high thermal conductivity and may be also poor in anti-corrosivity. Therefore, it may be difficult to use pure Ag for the reflective layer.

In order to improve these points, it may be recommended to use a reflective layer mainly composed of Ag in the form of an alloy according to any of the followings.

(i) As a result of studies for improving anti-corrosivity of Ag, it has been found that an Ag alloy containing at least one element selected from the group consisting of Rh Pd, Pt and Au is sufficiently small in refractive index, which is not more than 0.5, preferably not more than 0.3 in the wavelength region less than 600 nm, and also has a high anti-corrosivity.

(ii) As a result of studies for lowering thermal conductivity of Ag, it has been found that an Ag alloy containing at least one element selected from the group consisting of V, Cr, Mn, Fe, Co, Ni, Zr, Nb, Mo, Ta and W is small in refractive index, which is not more than 0.5, preferably not more than 0.3 in the wavelength region less than 600 nm, and is also sufficiently low in thermal conductivity.

(iii) As a result of studies for lowering thermal conductivity of Ag while improving its anti-corrosivity, it has been found that an Ag alloy containing Ti is small in refractive index, which is not more than 0.5, preferably not more than 0.3 in the wavelength region less than 600 nm, and is sufficiently low in thermalt conductivity and also excellent in anti-corrosivity.

The thickness of the reflective layer used in the magneto-optical recording medium is usually 20 to 150 nm, preferably 30 to 100 nm.

It is known that thermal conductivity of a thin film differs greatly from that of a bulk of the same composition. It is, therefore, meaningless to infer thermal conductivity of a thin film from measurement of thermal conductivity of a bulk or a thick film.

On the other hand, it is impossible to directly measure thermal conductivity of a thin film with a thickness of the order of 20 to 150 nm, because the substrate is too thick and its own thermal conductivity is too high in comparison with the thin film.

It is said that thermal conduction of a metal such as Ag depends on the free electrons in the metal. The free electrons in the metal also take a part in an electric conduction in the metal. It is, therefore, considered that thermal conductivity and electric conductivity of a metal correspond to each other. In fact, when the correspondence of thermal conductivity and electric conductivity of various metal elements was examined based on the data given in an Agne's Latest Periodic Table of Elements compiled by Toshi Inoue et al, it has been found that thermal conductivity and electric conductivity are in a clear-cut proportional relation to each other.

This means that thermal conductivity of a thin metal film can be known from measuring electric conductivity of the film. An electric resistivity of a reflective thin layer formed on a glass substrate was measured by a four-probe method, and thermal conductivity was decided from the obtained electric conductivity.

Incidentally, the thermal conductivity of Ag with a thickness of about 100 nm was notably different from that of Ag of a bulk obtained from the Periodic Table.

In the Ag alloy of the reflective layer, Ag concentration is not less than 70 atom %, preferably 90 to 99.5 atom %, and the concentration of the additive element(s) is not more than 30 atom %, preferably 0.5 to 10 atom %.

When the additive element concentration is too high, the refractive index of the reflective layer exceeds 0.5, making it unable to obtain a desired figure of merit. On the other hand, when the additive element concentration is too low, there can not be attained satisfactory reduction of thermal conductivity and/or improvement of anti-corrosivity.

The optimal concentrations of the respective elements in the Ag alloy are as follows:

Rh: 0.1 to 4.7 atom %
Pd: 0.1 to 5.1 atom %
Pt: 0.1 to 7.0 atom %
Au: 0.1 to 28.8 atom %
V: 0.5 to 8.0 atom %
Cr: 0.8 to 8.2 atom %
Mn: 1.1 to 7.5 atom %
Fe: 0.7 to 12.1 atom %
Co: 0.8 to 12.5 atom %
Ni: 1.3 to 14.2 atom %
Zr: 0.2 to 1.8 atom %
Nb: 0.2 to 4.0 atom %
Mo: 0.2 to 4.4 atom %
Ta: 0.6 to 10.8 atom %
W: 0.1 to 1.9 atom %
Ti: 0.4 to 7.0 atom %

Two or more of the elements shown above can be added to Ag for forming an Ag alloy. Particularly, when V, Cr, Mn, Fe, Co, Ni, Zr, Nb, Mo, Ta and/or W, or Ph, Pd, Pt and/or Au are added to Ag, there can be realized both reduction of thermal conductivity and improvement of anti-corrosivity. Also, Ti, or Ph, Pd, Pt and/or Au are added to Ag, further improvement of anti-corrosivity, and further reduction of thermal conductivity can be achieved.

The thickness of the reflective layer is 30 to 100 nm.

The interference layer (dielectric layer) is a layer made of a dielectric material and designed to interfere laser beam. Generally, it is disposed between the substrate and the magneto-optical recording layer to cause multiple reflection of light therebetween. It has the role of increasing the apparent magnetic Kerr rotation angle and making light interference.

Satisfactory interfering effect can not be obtained unless the thickness of the interference layer is changed in conformity to the wavelength of laser beam used. In view of the practical beam wavelength in the range of 400 to 600 nm, it is preferable for the interference layer to have a thickness of 20 to 55 nm, in case of making use of the primary interference spots. In case of making use the secondary interference spots, the thickness of the interference layer is preferably 120 to 200 nm.

The interference layer formed between the substrate and the magneto-optical recording layer also has the roles of enhancing adhesiveness between the substrate and the magneto optical recording layer, thermo-insulating the substrate and magneto-optical recording layer from each other, and protecting the magneto-optical recording layer from moisture which may come through the substrate.

As for the material of the interference layer, usually an amorphous thin film made of silicon nitride, tantalum oxide, silicon oxide, aluminum oxide, titanium oxide, zinc sulfide or a mixture of these compounds may be exemplified.

An interference layer made of a dielectric material disposed between the magneto-optical recording layer and the reflective layer. By disposing such interference layer, further enhancement of light interfering effect and an increase of the magnetic Kerr rotation angle can be obtained.

However, in case the wavelength of laser beam used is less than 600 nm, the interfering effect is higher than when the wavelength is around 800 nm of current use, and reduction of reflectivity by the interfering effect is remarkable.

Excessive reduction of reflectance gives rise to the problems such as weakening of the signal for tracking. Therefore, in the case of a magneto-optical recording medium using laser beam with a wavelength less than 600 nm, it is rather preferred to contact directly the reflective layer with the magneto-optical recording layer without disposing therebetween an interference layer made of a dielectric material.

The protective layer for chemically and physically protecting the above-described layers from the environment is preferably made of a curable material such as an acrylic ultraviolet curing resin. This protective layer is usually formed by coating the resin on the reflective layer to a thickness of about 2 to 20 μm by spin coating and curing the resin with ultraviolet-light irradiation.

A layer made of a dielectric material such as mentioned above may be disposed between the protective layer composed of an ultraviolet curing resin or other curable material (organic material) and the reflective layer to serve as an additional protective layer.

It is recommended to take the following step (i) or (ii) for preventing corrosion of the reflective layer mainly composed of Ag.

(i) The surface of the reflective layer is subjected to a triazinethiol-based compound treatment. This treatment gives extra protection of the reflective layer against corrosion to enhance reliability of the recording medium. As the triazinethiol-based compound used in this treatment, a compound represented by the following formula (1) is preferred:

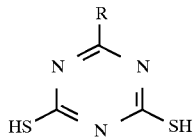

[1]

wherein R represents —$SR^1$ or —$NR^2R^3$ in which $R^1$, $R^2$ and $R^3$ each represent a hydrogen atom or a hydrocarbon group which is preferably a $C_{1-20}$ alkyl, $C_{2-20}$ alkenyl, or $C_{6-20}$ aryl group.

The preferred treating method comprises dissolving a triazinethiol-based compound in an alcohol solvent in a ratio of 0.001 to 0.05 wt %, preferably 0.005 to 0.03 wt % based on the solvent, coating the obtained solution on the surface of the reflective layer by spin or dip coating and drying the obtained coated film.

The treated surface thereof may be washed with an alcohol solvent to remove the residual triazinethiol-based compound on the disc.

(ii) An ultraviolet curing resin containing a triazinethiol-based compound is coated on the outer surface of the reflective layer mainly composed of Ag and the coating is cured by ultraviolet-light irradiation to form a protective layer. This protective layer can minimize or substantially eliminate the risk of corrosion of the reflective layer to enhance reliability of the recording medium. A compound represented by the following formula (1) is preferably used as the triazinethiol-based compound:

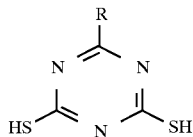

[1]

wherein R represents —$SR^1$ or —$NR^2R^3$ in which $R^1$, $R^2$ and $R^3$ each represents a hydrogen atom or a hydrocarbon group which is preferably a $C_{1-20}$ alkyl, $C_{2-20}$ alkenyl, or $C_{6-20}$ aryl group.

As the ultraviolet curing resin, an acrylic resin is preferably used. A triazinethiol-based compound is dissolved in a solvent in a ratio of 0.001 to 0.05 wt %, preferably 0.01 to 0.03 wt % based on the solvent, and the resultant solution is coated on the surface of the reflective layer by suitable means such as spin coating or screen printing.

The magneto-optical recording medium of the present invention has the figure of merit of not less than 3.8, preferably 4.0 to 5.0 at a wavelength of less than 600 nm.

According to the present invention, as described above in detail, there is provided a magneto-optical recording medium with high C/N ratio corresponding to high-density recording and high reliability.

It is especially remarkable that the present invention provides a high-performance magneto-optical recording medium operable at a wavelength less than 600 nm, which is shorter than the wavelengths currently in use, and a high-recording-density magneto-optical recording system using light with a wavelength less than 600 nm is realized.

EXAMPLES

The present invention is explained in more detail in the following Examples, however, it should be recognized that the scope of the present invention is not restricted to these Examples.

Example 1

On a glass substrate having 1.2 mm in thickness, a thin film of tantalum oxide was formed as a dielectric layer by reactive sputtering method. The layer surface was etched by high frequency plasma for 5 minutes to smoothen the surface. The initial film thickness was so set that the thickness of the tantalum oxide layer after etching would become about 35 nm.

Then an amorphous alloy having a composition of $Tb_{20}Fe_{64}CO_{16}$ (figures being atom %) was formed on the tantalum oxide layer to a thickness of about 20 nm by DC magnetron sputtering to form a magneto-optical recording layer. On this layer was deposited Ag to a thickness of about 50 nm by DC magnetron sputtering to form a reflective layer.

On the reflective layer, there were formed an ultraviolet curing resin layer having 30 nm in thickness by spin coating as a protective layer to constitute a magneto-optical recording medium.

The recording and reading-out characteristics of this recording medium were confirmed by determining the magnetic Kerr hysteresis curve and reflectivity. That is, when the squareness ratio of the hysteresis curve is 1 and the coercive force is large, it can be judged that the recording medium has good recording characteristics, and when the product of the square root of reflectivity and the magnetic Kerr rotation angle is large at the wavelength of laser beam used, then it can be judged that the recording medium has good reading-out characteristics.

Measurement of reflectivity was conducted through the substrate at a flat specular portion where no groove was provided. First, relative reflectivity of an optical disc against an aluminum film was measured by a spectrophotometer with the angle of incidence set at 2°, and the measurement was calibrated by using the absolute reflectivity of the aluminum film which had previously been measured by a separate device. In the actual drive, the light reflected from the substrate surface does not contribute to the signal, so that the light reflected from the substrate surface was calculated from the optical constant of the glass substrate and deducted from the measured value for determining reflectivity.

Determination of the magnetic Kerr hysteresis curve was made according to the polarized angle modulation method through the substrate at a flat specular portion where no groove was provided as in the case of measurement of reflectivity. The magnetic Kerr rotation angle was decided by comparing the hysteresis curve and the change of output observed when the Glan-Thompson prism analyzer was rotated through a unit angle. However, since the light reflected from the substrate surface and not concerned with rotation of the polarized angle is included, there is obtained apparently an rotation angle smaller than the actual one.

So, the actual magnetic Kerr rotation angle was decided by adding correction to the above-determined rotation angle in consideration of the light reflected from the substrate surface. A measuring wavelength of 450 nm was selected for the measurement.

From the shape of the hysteresis curve, it was learned that the squareness ratio is 1 and the coercive force is about 800 kA/m. This coersivity is of the same level as the currently marketed magneto-optical discs for wavelengths around 800 nm, which indicates that recording characteristics of this medium is as good as the present recording medium. Also, reflectivity at 450 nm was 10.3%, the magnetic Kerr rotation angle was 1.33°, and the figure of merit as determined from the product of the square root of reflectivity and the magnetic Kerr-rotation angle was 4.3. These values attest to the excellent reading-out characteristics.

Incidentally, the performance of the presently marketed magneto-optical discs at 800 nm is as follows: reflectivity: 23.1%; magnetic Kerr rotation angle: 1.00; figure of merit: about: 4.8.

Comparative Example 1

A magneto-optical disc was produced by following the same procedure as Example 1 except that the reflective layer was formed by depositing aluminum to a thickness of about 50 nm. The recording and reading-out characteristics of this disc were evaluated in the same manner as Example 1.

This disc had a squareness ratio of 1 and a coercive force of about 800 kA/m and showed good recording characteristics. However, reflectivity at 450 nm was 16.1%, the magnetic Kerr rotation angle was 0.84°, and the figure of merit was as low as 3.4. This disc showed poor reading-out characteristics.

Comparative Example 2

A magneto-optical disc was produced by following the same procedure as Example 1 except that the reflective layer was formed by depositing gold to a thickness of about 50 nm, and the recording and reading-out characteristics of the obtained disc were evaluated in the same manner as Example 1. The squareness ratio was 1 and the coercive force was about 800 kA/m. This disc showed good recording characteristics. However, reflectivity at 450 nm was 11.3%, the magnetic Kerr rotation angle was 1.03°, and the figure of merit was only 3.5. It indicated poor reading-out characteristics of this disc.

Example 2

A magneto-optical recording medium was produced by following the same method as Example 1 except that a solution prepared by dissolving a triazinethiol-based compound represented by the following formula (2) in an ultraviolet curing resin SD-318 (produced by Dai-Nippon Ink Chemical Co., Ltd.) in a ratio of 0.02% by weight was spin coated on the reflective layer and cured by ultraviolet-light irradiation to form a protective layer having 3 μm in thickness.

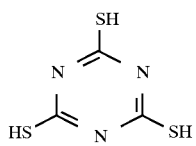
[2]

The recording and reading-out characteristics of this recording medium were evaluated in the same manner as Example 1.

From the shape of the hysteresis curve, it was determined that the squareness ratio of this recording medium was 1 and its coercive force was about 800 kA/m. These values are of the same level as the presently marketed magneto-optical discs for wavelengths around 800 nm, which indicates good recording characteristics.

This recording medium also showed a reflectivity of 10.3% at 450 nm and an magnetic Kerr rotation angle of 1.33°. The figure of merit determined from the product of the square root of reflectivity and the magnetic Kerr rotation angle was 4.3.

In comparison with the performance of the commercial magneto-optical discs at 800 nm—reflectivity: 23.1%; magnetic Kerr rotation angle: 1.00°; figure of merit: about 4.8–, it is evident that the present recording medium has excellent reading-out characteristics.

In order to examine reliability, the present recording medium was subjected to a 500-hour high temperature and high humidity life test under the conditions of 85° C. and 85% RH, and after the test, the recording medium was visually checked to see whether it suffered corrosion or not. There was recognized no corrosion in the recording medium and also no significant difference in reflectivity was seen after the above test, assuring high reliability of the present recording medium.

Example 3

A magneto-optical disc was produced by following the same procedure as Example 2 except that a compound represented by the following formula (3) was used as the triazinethiol-based compound dissolved in the ultraviolet curing resin:

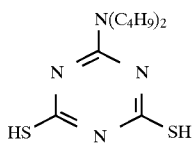
[3]

The recording characteristics, reading-out characteristics and reliability of the disc were evaluated in the same manner as Example 2. There was noted no significant difference from Example 2 in evaluation results, which attests to the good qualities of the present disc.

Example 4

A magneto-optical recording medium was produced by following the same procedure as Example 1 except that a 0.02 wt % (based on solvent) methanol solution of a triazinethiol-based compound of the following formula (2) was spin coated on the reflective layer and methanol was dropped onto the inner periphery of the disc while turning it to wash away the superfluous compound (2), and that an ultraviolet curing resin SD-318 (produced by Dai-Nippon Ink Chemical Co., Ltd.) was spin coated on the above surface-treated reflective layer and cured by ultraviolet-light irradiation to form a protective layer.

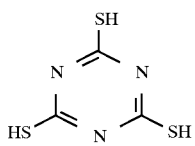
[2]

The recording and reading-out characteristics of this recording medium were evaluated in the same manner as Example 1.

From the shape of the hysteresis curve, it was determined that the squareness ratio is 1 and the coercive force is about 800 kA/m. These values are of the same level as the presently marketed magneto-optical discs for wavelengths around 800 nm, which indicates good recording characteristics of this recording medium. It also showed a reflectivity of 10.5% at 450 nm and a magnetic Kerr rotation angle of 1.32°. The figure of merit determined from the product of the square root of reflectivity and the magnetic Kerr rotation angle was 4.3.

In the comparison with the performance of the presently marketed magneto-optical discs at 800 nm—reflectivity: 23.1%; magnetic Kerr rotation angle: 1.00°; figure of merit: about 4.8–, it is evident that the present recording medium has excellent reading-out characteristics.

In order to examine reliability, the present recording medium was subjected to a 500-hour high temperature and high humidity life test, and after the test, the recording medium was checked to see whether it suffered corrosion or not. There was observed no corrosion in the recording medium nor any significant difference in reflectivity after the test, which ensures high reliability of the present recording medium.

Example 5

A magneto-optical disc was produced by following the same procedure as Example 4 except that a compound of the following formula (3) was used as the triazinethiol-based compound for surface treatment of the reflective layer.

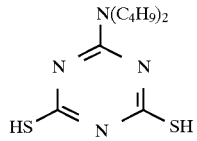   [3]

The recording and reading-out characteristics and reliability of the obtained disc were evaluated in the same manner as Example 4. There was noted no significant difference from Example 4 in evaluation results, indicating high qualities of this disc.

Comparative Example 3

A magneto-optical disc was produced by following the same procedure as Example 4 except that as the reflective layer a deposited aluminum thin film having about 50 nm in thickness was used. The recording and reading-out characteristics of the produced magneto-optical disc were evaluated in the same manner as Example 1.

The squareness ratio was 1 and the coercive force was about 800 kA/m, which indicates good recording characteristics of this disc. However, reflectivity at 450 nm was 15.9% and the magnetic Kerr rotation angle was 0.86°. The figure of merit was as low as 3.4, indicating poor reading-out characteristics of this disc.

Comparative Example 4

A magneto-optical disc was produced by following the same procedure as Example 4 except for using as the reflective layer a deposited gold thin having about 50 nm in thickness, and its recording and reading-out characteristics were evaluated in the same manner as Example 4.

The squareness ratio was 1 and the coercive force was about 800 kA/m, which shows good recording characteristics of this disc. However, reflectivity at 450 nm was 11.6% and the magnetic Kerr rotation angle was 0.99°. The figure of merit was only 3.4, which pointed to poor reading-out characteristics of this disc.

Example 6

On a glass substrate having 1.2 mm in thickness, a thin film of tantalum oxide was formed as a dielectric layer by reactive sputtering method. Then the film surface was subjected to high-frequency plasma etching treatment for 5 minutes to smoothen the surface.

The initial film thickness was so set that the thickness of the tantalum oxide layer after etching would become about 35 nm. On the tantalum oxide layer, an amorphous alloy having a composition of $Tb_{20}Fe_{64}Co_{16}$ (figures: atom %; Co content in 3d transition metal (Fe): 20%) was deposited to a thickness of about 20 nm by DC magnetron sputtering to form a magneto-optical recording layer.

On this recording layer, DC magnetron sputtering was carried out with placing Rh chips on the Ag target to form a reflective layer having about 50 nm in thickness. Analysis showed that this reflective layer composition was 0.6 atom % Rh and 99.4 atom % Ag.

On this reflective layer, an ultraviolet curing resin was spin coated to provide a organic protective layer having about 3 μm in thickness, thereby producing a magneto-optical recording medium.

A sample was produced by following the same process as the above except that no ultraviolet curing resin protective layer was provided, and the obtained sample was subjected to measurement of magnetic Kerr loops by raising temperature. Loops were observed even at 220° C. and the Curie temperature of the magneto-optical recording layer was higher than 220° C.

The recording and reading-out characteristics of the obtained magneto-optical recording medium were evaluated by a magneto-optical recording tester using a 488 nm Ar laser as light source. The recording and reading-out conditions in the evaluation test: were as follows.

Recording conditions
Linear velocity: 10 m/s
Recording frequency: 2 MHz
Duty: 50%
Magnetic field applied for recording: 24 kA/m
Recording laser power was varied.
Reading out conditions
Linear velocity: 10 m/s
Reproducing laser power: 1 mW
The maximum value of C/N ratio when the recording power was changed is shown in Table 2.

Example 7

The same procedure as Example 6 was carried out except that the magneto-optical recording layer was formed by depositing an amorphous alloy having a composition of $Nd_{10}Tb_{15}Fe_{38}CO_{37}$ (figures: atom %; Co content in 3d transition metal (Fe): 49%) to a thickness of about 20 nm, thereby obtaining a magneto-optical recording medium. The Curie temperature of this medium was above 220° C. The recording and reading-out characteristics of the medium were evaluated in the same manner as Example 6. The maximum value of C/N ratio when the recording power was changed is shown in Table 2.

Comparative Example 5

The same procedure as Example 6 was conducted except that the reflective layer was formed by depositing an AlTa alloy to a thickness of about 50 nm, and the recording and reading-out characteristics of the produced magneto-optical recording medium were evaluated in the same manner as Example 6. The maximum value of C/N when the recording power was changed is shown in Table 2.

TABLE 2

|  | C/N |
|---|---|
| Example 6 | 54 dB |
| Example 7 | 54 dB |
| Comparative Example 5 | 51 dB |

A good C/N ratio is obtained in Examples 6 and 7. It is noted that a combination of a magnetic layer having a Curie temperature not less than 220° C. and a reflective layer mainly composed of Ag is essential.

In order to examine anti-corrosivity of the reflective layers used in Examples 6 and 7 and Comparative Example 5, the samples were prepared according to the same procedures as Examples 6 and 7 and Comparative Example 5 except that no ultraviolet curing resin protective layer was provided, and these samples were kept in a 85% RH high-temperature and high-humidity thermostat for 500 hours. Thereafter, the samples were visually observed to see whether they suffered corrosion or not. No corrosion was seen in the samples of Examples 6 and 7. This indicates that addition of Rh to Ag is effective for improving anti-corrosivity.

Example 8

A magneto-optical recording medium was produced by following the same procedure as Example 6 except that a reflective layer (thickness: about 50 nm) was formed on the magneto-optical recording layer by DC magnetron sputtering with V chips placed on the Ag target. Analysis showed the reflective layer composition of 1.4 atom % V and 98.6 atom % Ag.

A sample was produced by following the same procedure described above except that no ultraviolet curing resin was provided and the sample was checked for magnetic Kerr loops by raising the temperature. The loops were observed even at 220° C., indicating that the Curie temperature of the magneto-optical recording layer was higher than 220° C.

The recording and reading-out characteristics of this magneto-optical recording medium were evaluated in the same manner as Example 6.

The C/N ratio was measured by changing the recording power by 0.5 mW at a time, and the recording power Pth at rise-up of C/N ratio and the maximum value of C/N ratio were examined. The results are shown in Table 3. A larger value of Pth means a lower recording sensitivity.

Example 9

A magneto-optical recording medium was produced by following the same procedure as Example 8 except that a magneto-optical recording layer (thickness: about 20 nm) was formed by deposition of an amorphous alloy with a composition of $Nd_{10}Tb_{15}Fe_{38}Co_{37}$ (figures: atom %; Co content in 3d transition metal (Fe): 49%). The Curie temperature of the recording layer was not less than 220° C. The results of evaluation of the recording and reading-out characteristics of the obtained magneto-optical recording medium are shown in Table 3.

Example 10

The same procedure as Example 8 was conducted except that a reflective layer (thickness: about 50 nm) was formed by deposition of TaAg alloy. The reflective layer composition was 2.0 atom % Ta and 98.0 atom % Ag. The results of evaluation of the recording and reading-out characteristics of the obtained magneto-optical recording medium are shown in Table 3.

Comparative Example 6

A magneto-optical recording medium was produced by following the same procedure as Example 6 except that a magneto-optical recording layer was composed of $Tb_{22}Fe_{72}Co_8$ amorphous alloy with about 190° C. Curie temperature. The results of evaluation of the recording and reading-out characteristics of the obtained magneto-optical recording medium are shown in Table 3.

TABLE 3

|  | Pth | C/N |
|---|---|---|
| Example 8 | 6 mW | 54 dB |
| Example 9 | 6 mW | 54 dB |
| Example 10 | 6.5 mW | 54 dB |
| Comparative Example 6 | 3 mW | 51 dB |

As is seen from Table 3, good C/N ratio is obtained in Examples 8 to 10 and also the products of these Examples have no problem on recording sensitivity. On the other hand, in the case of Comparative Example 6, although recording sensitivity is high, the C/N ratio is notably lower than that of the products of Examples 8 to 10.

Example 11

The same procedure as Example 6 was carried out except that a reflective layer (thickness: about 50 nm) was formed on the magneto-optical recording layer by DC magnetron sputtering with Ti chips placed on the Ag target. Analysis showed the reflective layer composition of 1.1 atom % Ti and 98.9 atom % Ag.

A sample was made according the same procedure except that no ultraviolet curing resin was provided, and this sample was checked for magnetic Kerr loops by raising the temperature. The loops were observed even at 220° C., indicating that the Curie temperature of the magneto-optical recording layer was higher than 220° C.

The recording and reading-out characteristics of the obtained magneto-optical recording medium were evaluated in the same manner as Example 6.

The C/N ratio was measured by changing the recording power by 0.5 mw at a time, and the recording power Pth at rise-up of C/N ratio and the maximum value of C/N ratio were examined. The results are shown in Table 4. The larger the value of Pth, the lower the recording sensitivity.

Example 12

A magneto-optical recording medium was produced by following the same procedure as Example 11 except that a magneto-optical recording layer (thickness: about 20 nm) was formed by deposition of an amorphous alloy $Nd_{10}Tb_{15}Fe_{38}Co_{37}$ (figures: atom %; Co content in 3d transition metal (Fe): 49%). The Curie temperature of the recording layer was higher than 220° C. The results of evaluation of the recording and reading-out characteristics of this magneto-optical recording medium are shown in Table 4.

TABLE 4

|  | Pth | C/N |
|---|---|---|
| Example 11 | 6 mW | 54 dB |
| Example 12 | 6 mW | 54 dB |

As is seen from Table 4, good C/N ratio is obtained in Examples 11 and 12 and also the products of these Examples are quite satisfactory in recording sensitivity.

In order to examine anti-corrosivity of the reflective layers used in Examples 11 and 12, the samples were produced according to the same procedures as these Examples except that no protective layer of ultraviolet curing resin was provided, and these samples were kept in a high temperature (85° C.) and high humidity (85% RH) life test chamber for 500 hours.

Thereafter the samples were visually checked for corrosion, but no corrosion was seen in the samples. This shows that the reflective layer composed of Ag and Ti is conducive to improvement of anti-corrosivity.

Example 13

On a glass substrate having 1.2 mm in thickness a thin film of tantalum oxide was formed as a dielectric layer by reactive sputtering. Then the layer surface was etched by high-frequency plasma for 5 minutes to smoothen the surface.

The initial film thickness was so set that the tantalum oxide layer thickness after etching would become about 65 nm. On this tantalum oxide layer was deposited an amorphous alloy $Tb_{20}Fe_{72}Co_8$ (figures: atom %) to a thickness of about 20 nm by DC magnetron sputtering to form a magneto-optical recording layer. On this recording layer was further deposited Ag to a thickness of about 50 nm by DC magnetron sputtering to form a reflective layer.

On the reflective layer, a solution prepared by dissolving a triazinethiol-based compound of the following formula (2) in an ultraviolet curing resin SD-318 (produced by Dai-Nippon Ink Chemical Co., Ltd.) in a ratio of 0.02% by weight based on the solvent was spin coated and the obtained coating film was cured by ultraviolet-light irradiation to form a protective layer having about 3 μm in thickness.

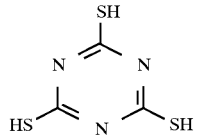

[2]

The magneto-optical recording and reading-out characteristics of the thus produced magneto-optical recording medium at a wavlength of 800 nm were examined.

The recording and reading-out characteristics were confirmed from determination of the magnetic Kerr hysteresis curve and reflectivity.

That is, when the squareness ratio of the hysteresis curve of the recording medium is 1 and its coercive force is large, then the recording medium can be judged as having good recording characteristics. Also, when the product of the square root of reflectivity and the magnetic Kerr rotation angle is large at the wavelength of laser beam used, then the recording medium can be judged as having good reading-out characteristics.

Reflectivity was measured through the substrate at a specular portion of the disc. First, with the incidence angle set at 2°, relative reflectivity for the aluminum film was measured by a spectrophotometer, and the measurement was calibrated by using the previously determined absolute reflectivity of the aluminum film.

In the actual drive, the light reflected on the substrate surface has no bearing on the signal, so that the light reflected on the substrate surface was calculated from the optical constant of the glass substrate and deducted from the measured value for determining reflectance. Measurement of the magnetic Kerr hysteresis curve was made through the substrate at a specular portion of the disc as in the case of reflectivity.

The magnetic Kerr rotation angle was decided by comparing the hysteresis curve and the change of output taking place when the Glan-Thompson prism analayzer was rotated through a unit angle. However, since the light reflected from the substrate surface and not concerned with rotation of the plane of polarization is contained, there is obtained an angle of rotation which is apparently smaller than the actual one. So, the actual magnetic Kerr rotation angle was decided by adding corrections to the above determined rotation angle in consideration of the light reflected from the substrate surface.

From the shape of the hysteresis curve, the squareness ratio of the present recording medium was 1 and its coercive force was about 800 kA/m. These values are of the same level as the presently marketed magneto-optical discs, which indicates that the present recording medium has good recording characteristics.

It was also found that reflectivity of this recording medium was 20.4% and the magnetic Kerr rotation angle is 1.30°, and the figure of merit determined from the product of the square root of reflectivity and the magnetic Kerr rotation angle was 5.9.

Incidentally, measurement of performance at 800 nm of the presently marketed magneto-optical discs having an Al alloy reflective layer gave the following results: reflectivity: 23.1%; magnetic Kerr rotation angle: 1.00°; figure of merit: about 4.8. In view of this, it can be said that the present recording medium has far better reading-out characteristics than the presently marketed magneto-optical discs.

In order to examine reliability of the present recording medium, it was subjected to a 500-hour high temperature (80° C.) and high humidity (85% RH) life test, and after the test, the medium was visually observed to see whether it suffered corrosion or not. There was seen no corrosion in the medium nor any significant difference of reflectivity after the test. This indicates high reliability of the present recording medium.

Example 14

A magneto-optical disc was produced by following the same procedure as Example 13 except that a compound of the following formula (3) was employed as the triazinethiol-based compound used for surface treatment of the reflective layer.

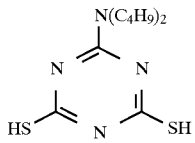

[3]

The results of evaluation of recording and reading-out characteristics and reliability of this magneto-optical disc, conducted in the same manner as Example 13, were much the same as those of Example 13, which indicates high qualities of the present magneto-optical disc.

Example 15

The same procedure as Example 13 was carried out except that a 0.02 wt % (based on solvent) methanol solution of a triazinethiol-based compound of the following formula (2) was spin coated on the reflective layer, then methanol was dropped onto the inner peripheray of the disc while rotating it to wash away the superfluous compound (2) and then an ultraviolet curing resin SD-318 (produced by Dai-Nippon Ink Chemical Co., Ltd.) was spin coated on the above surface-treated reflective layer and cured by ultravioletlight irradiation to form a protective layer having about 3 μm in thickness.

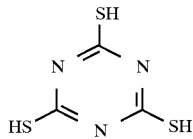

[2]

The recording and reading-out characteristics and reliability of the obtained magneto-optical disc were evaluated in the same way as Example 13.

It was learned from the shape of the hysteresis curve that the squareness ratio of the disc was 1 and its coercive force was about 800 kA/m. These values are of the same level as the currently marketed magneto-optical discs, which indicates good recording characteristics of the present disc. Also, this disc showed reflectivity of 20.8% and the magnetic Kerr rotation angle was 1.25°. The figure of merit determined from the product of the square root of reflectivity and the magnetic Kerr rotation angle was 5.7. Performance of the conventional magneto-optical discs having an Al alloy reflective layer, as determined at 800 nm, was: reflectivity: 23.1%; magnetic Kerr rotation angle: 1.00°; figure of merit: about 4.8. The above results indicate far better reading-out characteristics of the disc of the present invention than the presently marketed magneto-optical discs.

Further, in the life test on the present disc, there occurred no corrosion of the disc nor was seen any significant change of reflectivity. This indicates excellent reliability of the present disc.

Example 16

A magneto-optical disc was produced by following the same procedure as Example 1 except that a compound of the following formula (3) was used as the triazinethiol-based compound for surface-treatment of the reflective layer:

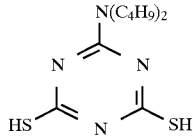

[3]

The results of evaluation of recording and reading-out characteristics and reliability of this disc, conducted in the same manner as Example 13, were much the same as Example 13.

Examples 17–26

The magneto-optical recording media were produced by following the same procedure as Example 6 except that a reflective layer (thickness: about 50 nm) was formed on the magneto-optical recording layer by DC magnetron sputtering with the chips shown in Table 5 being placed on the Ag target.

The Curie temperature of the magneto-optical recording layers in the obtained magneto-optical recording media was higher than 220° C.

The results of evaluation of recording and reading-out characteristics of the above magneto-optical recording media, conducted in the same manner as Example 6, are shown in Table 5.

Examples 27–29

The magneto-optical recording media were produced by following the same procedure as Example 6 except that a reflective layer (thickness: about 50 nm) was formed on the magneto-optical recording layer by conducting co-sputtering of Ag target adding element target such as Fe, Co, or Ni target.

The Curie temperature of the magneto-optical recording layers in the obtained magneto-optical recording media was higher than 220° C.

The results of evaluation of recording and reading-out characteristics of the above magneto-optical recording media, conducted in the same manner as Example 6, are shown in Table 5.

TABLE 5

| Example | Added element(s) | Composition (atom %) | Pth | C/N |
| --- | --- | --- | --- | --- |
| 17 | Pd | 2.5 | 8.5 mW | 53 dB |
| 18 | Pt | 2.5 | 8.0 mW | 53 dB |
| 19 | Au | 3.3 | 9.0 mW | 55 dB |
| 20 | Cr | 2.5 | 6.0 mW | 54 dB |
| 21 | Mn | 2.0 | 7.5 mW | 54 dB |
| 22 | Zr | 0.5 | 6.0 mW | 53 dB |
| 23 | Nb | 1.0 | 5.0 mW | 54 dB |
| 24 | Mo | 1.0 | 4.5 mW | 54 dB |
| 25 | Ta | 1.5 | 7.0 mW | 54 dB |
| 26 | W | 0.9 | 5.5 mW | 53 dB |
| 27 | Fe | 3.0 | 5.0 mW | 54 dB |
| 28 | Co | 2.5 | 6.5 mW | 54 dB |
| 29 | Ni | 4.3 | 5.5 mW | 53 dB |

Examples 30–33

The magneto-optical recording media were produced by following the same procedures as Examples 6, 8 and 11, respectively, except that an ultraviolet curing resin SD-318 containing 0.01 wt % of a triazinethiol-based compound of the formula (2) was spin coated on the reflective layer and cured by ultravioletlight irradiation to form a protective layer.

The results of evaluation of recording and reading-out characteristics and reliability conducted according to Example 1 are shown in Table 6.

Examples 33–35

The magneto-optical recording media were produced by following the same procedures as Examples 6, 8 and 11, respectively, except that a methanol solution containing 0.05 wt % (based on solvent) of a triazinethiol-based compound of the formula (2) was spin coated on the reflective layer, then methanol was dropped onto the inner periphery of the disc while rotating it to wash away the superfluous compound, and further an ultraviolet curing resin SD-318 was spin coated on the surface treated reflective layer and cured by ultraviolet-light irradiation to form a protective layer.

The results of evaluation of recording and reading-out characteristics and reliability conducted in the same manner as Example 1 are shown in Table 6.

TABLE 6

| Example | Added element(s) | Composition (atom %) | Pth | C/N |
|---------|------------------|----------------------|------|-------|
| 30 | Rh | 0.6 | 6 mW | 54 dB |
| 31 | V | 1.4 | 6 mW | 54 dB |
| 32 | Ti | 1.1 | 6 mW | 54 dB |
| 33 | Rh | 0.6 | 6 mW | 54 dB |
| 34 | V | 1.4 | 6 mW | 54 dB |
| 35 | Ti | 1.1 | 6 mW | 54 dB |

What is claimed is:

1. A magneto-optical recording medium having a figure of merit, which is the product of the square root of a reflectivity and an actual magnetic Kerr rotation angle, of not less than 3.8 at a wavelength of less than 600 nm and a magnetic Kerr rotation angle of not less than 1.2 degree at a wavelength of less than 600 nm, said magneto-optical recording medium comprising:

a substrate, a magneto-optical recording layer of 10 to 30 nm thick comprising a Tb—Fe—Co amorphous alloy in which the Co content is 15 to 60 atom % based on the total amount of the Co content and Fe content or a Nd—Tb—Fe—Co amorphous alloy in which the Co content is 20 to 60 atom % based on the total amount of the Co content and Fe content, and having a Curie temperature of not less than 220° C.; and a reflective layer of 30 to 100 nm thick containing not less than 70 atom % Ag and having a refractive index of not more than 0.5 at a wavelength of less than 600 nm, the reflective layer being disposed on the magneto-optical recording layer which is disposed on the substrate.

2. A magneto optical recording medium according to claim 1, wherein the Ag alloy contains at least one element selected from the group consisting of Rh: 0.1 to 4.7 atom % based on the Ag alloy, Pd: 0.1 to 5.1 atom % based on the Ag alloy, Pt: 0.1 to 7.0 atom % based on the Ag alloy, Au: 0.1 to 28.8 atom % based on the Ag alloy, V: 0.5 to 8.0 atom % based on the Ag alloy, Cr: 0.8 to 8.2 atom % based on the Ag alloy, Mn: 1.1 to 7.5 atom % based on the Ag alloy, Fe: 0.7 to 12.1 atom, % based on the Ag alloy, Co: 0.8 to 12.5 atom % based on the Ag alloy, Ni: 1.3 to 14.2 atom % based on the Ag alloy, Zr: 0.2 to 1.8 atom % based on the Ag alloy, Nb: 0.2 to 4.0 atom % based on the Ag alloy, Mo: 0.2 to 4.4 atom % based on the Ag alloy, Ta: 0.6 to 10.8 atom % based on the Ag alloy, W: 0.1 to 1.9 atom % based on the Ag alloy, and Ti: 0.4 to 7.0 atom % based on the Ag alloy.

3. A magneto-optical recording medium according to claim 1, wherein the magneto-optical recording layer is made of a Tb—Fe—Co amorphous alloy in which the Co content is 15 to 50 atom % based on the total amount of the Co content and Fe content or a Nd—Tb—Fe—Co amorphous alloy in which the Co content is 35 to 50 atom % based on the total amount of the Co content and Fe content.

4. A magneto-optical recording medium according to claim 1, further including an interference layer having a thickness of 25 to 55 nm for wavelengths ranging from 400 nm to 600 nm, respectively, said interference layer comprising a dielectric material and disposed between the magneto-optical recording layer and the substrate.

5. A magneto-optical recording medium according to claim 1, wherein said figure of merit is 4.0 to 5.0.

6. A magneto-optical recording medium according to claim 1, wherein the reflective layer comprises an Ag alloy composed of not less than 70 atom % of Ag and not more than 30 atom % of at least one element selected from the group consisting of Ti, Rh, Pd, Pt, Au, V, Cr, Mn, Fe, Co, Ni, Zr, Nb, Mo, Ta and W.

7. A magneto-optical recording medium according to claim 6, wherein the element added is at least one element selected from the group consisting of V, Cr, Mn, Fe, Co, Ni, Zr, Nb, Mo, Ta and W.

8. A magneto-optical recording medium according to claim 6, wherein the element added is Ti.

9. A magneto-optical recording medium according to claim 6, wherein the element added is at least one element selected from the group consisting of Rh, Pd, Pt and Au.

* * * * *